(12) United States Patent
Chou

(10) Patent No.: US 8,128,297 B2
(45) Date of Patent: Mar. 6, 2012

(54) SELF-LUMINOUS KEYBOARD WITH BRIGHTNESS-ENHANCED KEYCAPS

(75) Inventor: Chin-Wen Chou, Taipei Hsien (TW)

(73) Assignee: Zippy Technology Corp., Hsin-Tien, Taipei (TW)

( * ) Notice: Subject to any disclaimer, the term of this patent is extended or adjusted under 35 U.S.C. 154(b) by 763 days.

(21) Appl. No.: 12/208,689

(22) Filed: Sep. 11, 2008

(65) Prior Publication Data

US 2010/0061789 A1  Mar. 11, 2010

(51) Int. Cl.
*B41J 5/08* (2006.01)

(52) U.S. Cl. .......... 400/472; 400/490; 362/84; 200/314; 200/317

(58) Field of Classification Search .............. 400/472
See application file for complete search history.

(56) References Cited

U.S. PATENT DOCUMENTS

| | | | | |
|---|---|---|---|---|
| 5,661,279 A * | 8/1997 | Kenmochi | ............... | 200/314 |
| 5,826,708 A * | 10/1998 | Finlay | ............... | 200/314 |
| 6,179,432 B1 | 1/2001 | Zhang | | |
| 6,199,996 B1 | 3/2001 | Katrinecz | | |
| 6,217,183 B1 * | 4/2001 | Shipman | ............... | 200/314 |
| 6,284,988 B1 | 9/2001 | Watanabe | | |
| 6,322,229 B1 | 11/2001 | Chan | | |
| 6,367,940 B1 * | 4/2002 | Parker et al. | ............... | 362/29 |
| 6,545,232 B1 * | 4/2003 | Huo-Lu | ............... | 200/314 |
| 6,554,442 B2 | 4/2003 | Chou | | |
| 6,743,993 B1 * | 6/2004 | Clark et al. | ............... | 200/314 |
| 6,860,612 B2 * | 3/2005 | Chiang et al. | ............... | 200/314 |
| 7,129,930 B1 * | 10/2006 | Cathey | ............... | 400/495 |
| 7,294,803 B2 * | 11/2007 | Lee et al. | ............... | 200/314 |
| 7,378,606 B2 * | 5/2008 | Lee et al. | ............... | 200/314 |
| 7,441,913 B2 * | 10/2008 | Bayersdorfer | ............... | 362/29 |
| 7,939,773 B2 * | 5/2011 | Tsai | ............... | 200/314 |

FOREIGN PATENT DOCUMENTS

| | | |
|---|---|---|
| TW | 438035 | 5/2001 |
| TW | 465777 | 11/2001 |
| TW | 468833 | 12/2001 |
| TW | 509955 | 11/2002 |
| TW | 516671 | 1/2003 |
| TW | 535385 | 6/2003 |
| TW | 570235 | 1/2004 |
| TW | I242737 | 11/2005 |

* cited by examiner

*Primary Examiner* — Jill Culler
(74) *Attorney, Agent, or Firm* — Muncy, Geissler, Olds & Lowe, PLLC

(57) ABSTRACT

A self-luminous keyboard with brightness-enhanced keycaps of the present invention comprises a baseplate, a substrate arranged above the baseplate, a plurality of keycaps coupled to the substrate and able to move up and down, a circuit board triggered by the contact of the keycap to output a signal, and a light emitting element. The substrate has a plurality of via-holes each corresponding to one keycap. There is a light transmission path from the light emitting element through the via-hole to the keycap. In each light transmission path, there is a light concentration member, and the light emitted by the light emitting element is concentrated by the light concentration member and then transmitted to the keycap. Thereby, the brightness of the keycaps is enhanced to be higher than the brightness of the gap between the adjacent keycaps, and the recognizability thereof is promoted.

19 Claims, 9 Drawing Sheets

SELF-LUMINOUS KEYBOARD WITH BRIGHTNESS-ENHANCED KEYCAPS

FIELD OF THE INVENTION

The present invention relates to a self-luminous keyboard with brightness-enhanced keycaps, particularly to a self-luminous keyboard non-uniformly backlighted to highlight the keycaps thereof.

BACKGROUND OF THE INVENTION

In the age of science and technology, computers have been indispensables for people and closely involved in the living of people. Every profession needs computers to aid operation. No matter desktops or notebooks, computers are widely used in various occasions. However, a user is usually hard to operate a keyboard in a dim or dark environment. Therefore, manufacturers had developed various self-luminous keyboards to enable users to accurately press correct keys, such as those disclosed by U.S. Pat. No. 6,179,432, U.S. Pat. No. 6,199,996, U.S. Pat. No. 6,284,988, U.S. Pat. No. 6,322,229, and U.S. Pat. No. 6,554,442, and Taiwan patents No. 438035, No. 465777, No. 468833, No. 509955, No. 516671, No. 535385, No. 570235, and No. 1242737. In the abovementioned prior-art patents, a light emitting plate is installed inside a keyboard to illuminate the keycaps and enable user to operate the keyboard in a dim or dark environment.

However, the entire keyboard is entirely and uniformly backlighted by the light emitting plate in the abovementioned prior-art patents, wherein the elastic members and the actuation mechanisms are arranged between the light emitting plate and the keycaps, and the elastic members, the actuation mechanisms and keycaps are usually made of a light-permeable material. In some prior-art patents, the keycaps are made of an opaque material, and the characters and symbols on the keycaps are made of a light-permeable material. The self-luminous keyboard is usually operated in a dim or dark environment, such as in an airliner or a vehicle. Thus, the intense light of the entirely and uniformly luminous keyboard may influence others and makes the user hard to recognize the individual characters or symbols on the keycaps. Even though the characters and symbols are made of a transparent material and the keycaps are made of an opaque material, the light projected from the gaps between the adjacent keycaps still makes the user hard to recognize the characters. For the case that the characters and symbols are made of an opaque material and the keycaps are made of a transparent material, the result is the same. For a user who is unfamiliar with the keyboard and cannot precisely memorize the positions of the characters, the situation is particularly serious, and he may thus input wrong instructions.

SUMMARY OF THE INVENTION

The primary objective of the present invention is to enhance the brightness of keycaps to make the brightness of each keycap higher than the brightness of the gap between the adjacent keycaps so that the keycaps can be easily recognized and the abovementioned problems can be overcome.

To achieve the abovementioned objective, the present invention proposes a self-luminous keyboard with brightness-enhanced keycaps comprising a keyboard portion and a light emitting element. The keyboard portion further comprises a baseplate, a substrate arranged above the baseplate, a plurality of keycaps coupled to the substrate and able to move up and down, and a circuit board triggered by the contact of the keycap to output a signal. The substrate has a plurality of via-holes each corresponding to one keycap. There is a light transmission path from the light emitting element through the via-hole to the keycap. In each light transmission path, there is a light concentration member, and light is concentrated by the light concentration member and then transmitted to the keycap. Thereby, the brightness of each keycap is enhanced to be higher than the brightness of the gap between the adjacent keycaps. Thereby, the present invention can exempt the user from the interference of the light of the gaps between the adjacent keycaps and enable the user to easily recognize the keys when he is using a keyboard in dim light or at night.

Therefore, the present invention outperforms the prior arts in that the present invention can promote the accuracy of operating a keyboard.

DETAILED DESCRIPTION OF THE PREFERRED EMBODIMENTS

Below, the technical contents of the present invention are described in detail in cooperation with the drawings.

Figure 1:
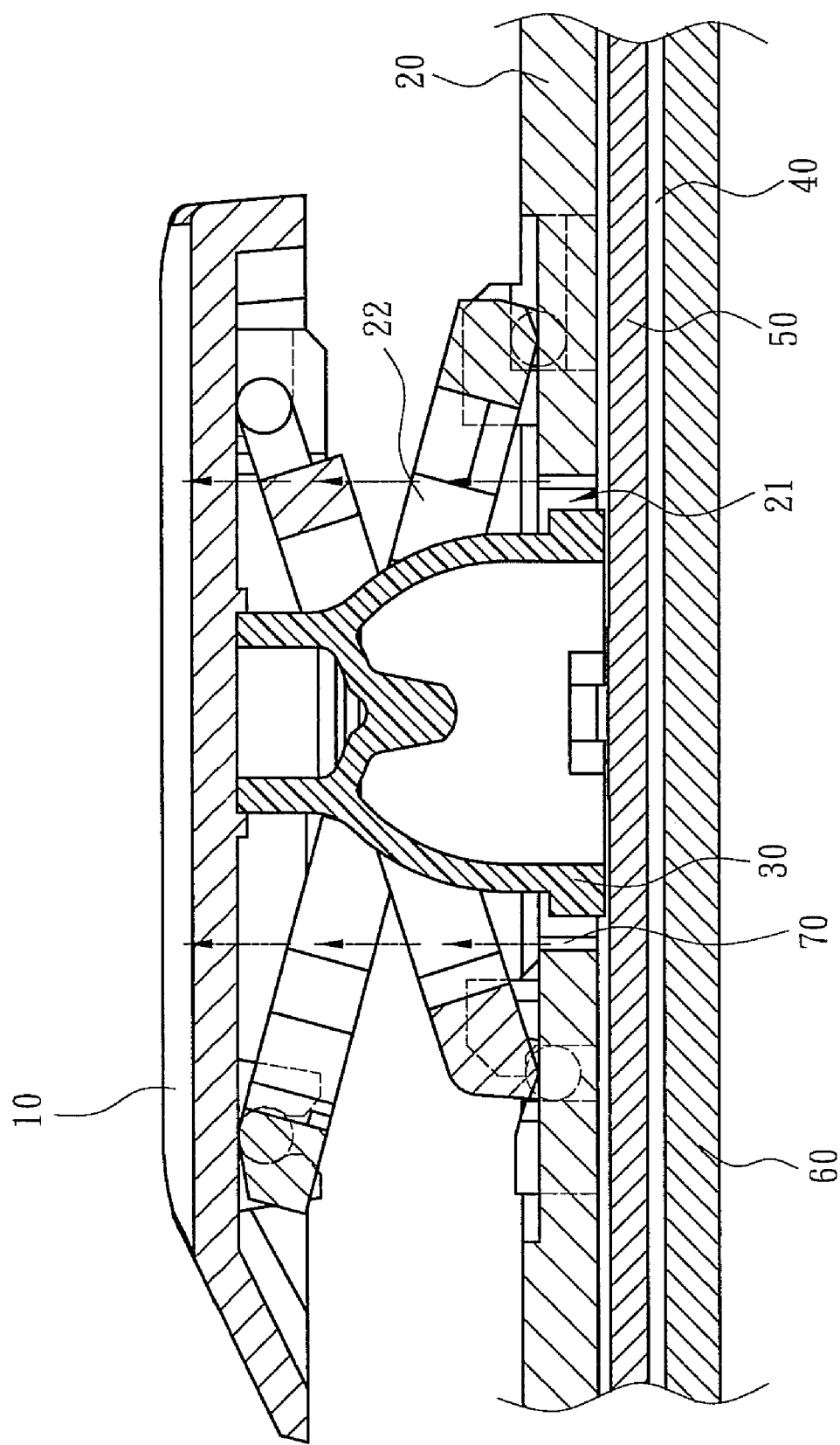
FIG. 1 is a sectional view schematically showing a first embodiment of the present invention.

Refer to FIG. 1 for a first embodiment of the present invention. The self-luminous keyboard with brightness-enhanced keycaps comprises a keyboard portion and a light emitting element 40. The keyboard portion further comprises a baseplate 60, a substrate 20 arranged above the baseplate 60, a plurality of keycaps 10 arranged above and coupled to the substrate 20, and able to move up and down, and a circuit board 50 triggered by the contact of the keycap 10 to output a signal. The substrate 20 has an actuation mechanism 22 coupled to one keycap 10 and a via-hole 21 corresponding to one keycap 10. An elastic member 30 is accommodated in the via-hole 21, and the elastic member 30 supports the keycap 10 and enables the keycap 10 to move up and down. When the keycap 10 is moved up and down, the circuit board 50 is contacted and triggered by the elastic member 30 to output a signal. The light emitting element 40 is used to provide light and may be a light-guiding plate or an electroluminescent plate. Herein, it is particularly mentioned that there is a light transmission path from the light emitting element 40 through the via-hole 21 to the keycap 10. In each light transmission path, there is a light concentration member 70, and the light emitted by the light emitting element 40 is concentrated by the light concentration member 70 and then projected to the keycap 10. Thereby, the brightness of each keycap 10 is enhanced, and the recognizability thereof is promoted. Thus is formed the basic architecture of the present invention. In the first embodiment, the light concentration member 70 is arranged on the wall of the via-hole 21 of the substrate 20, and the light emitting element 40 is arranged between the baseplate 60 and the circuit board 50. The light of the light emitting element 40 firstly passes through the circuit board 50, and then the light concentration member 70 on the via-hole 21 of the substrate 20 concentrates the light to promote the brightness of the keycap 10 thereabove. The light concentration member 70 may be a light concentration agent coated on the wall of the via-hole 21 or a light concentration plate fixedly installed on the wall of the via-hole 21.

Figure 2:
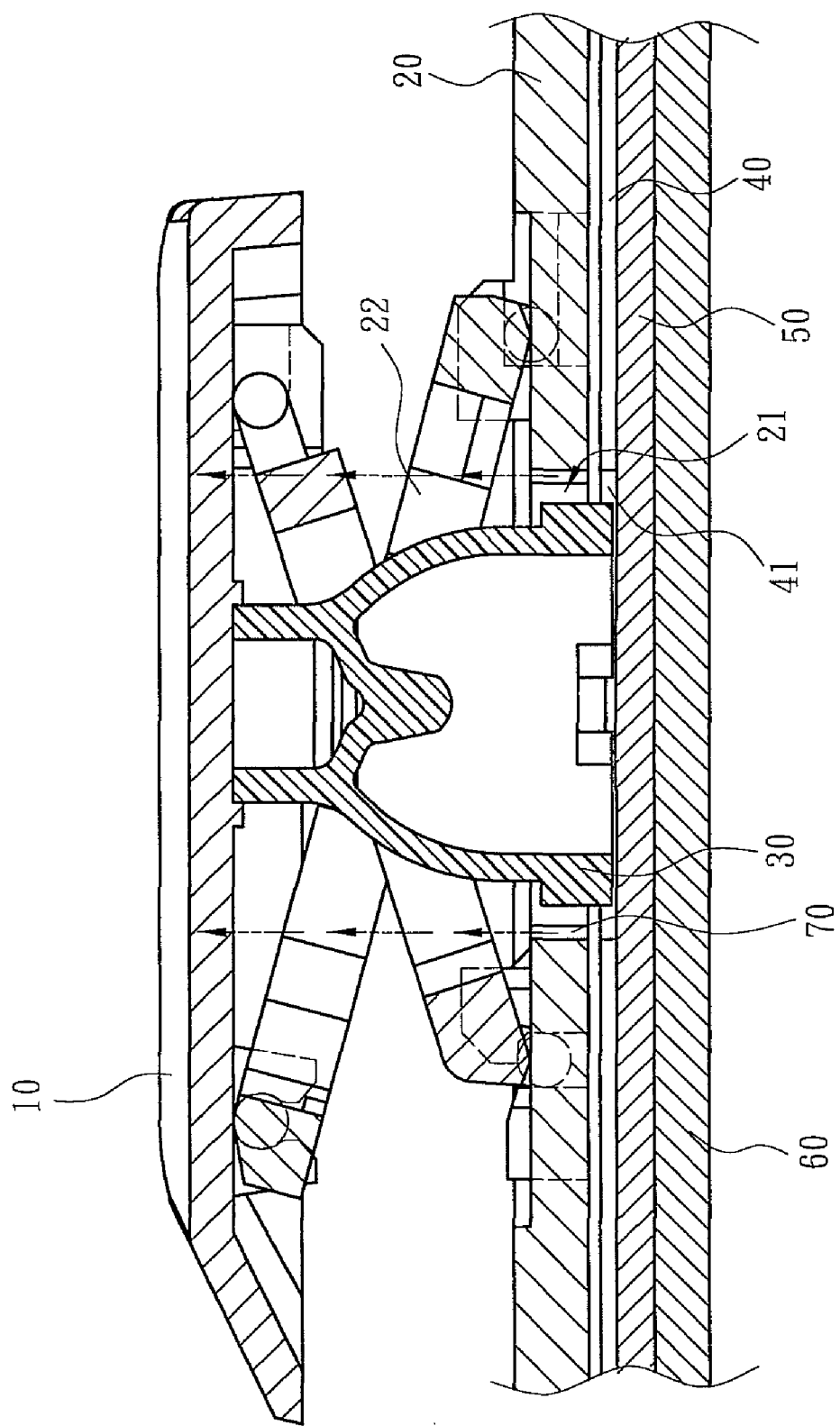
FIG. 2 is a sectional view schematically showing a second embodiment of the present invention.
Figure 3:
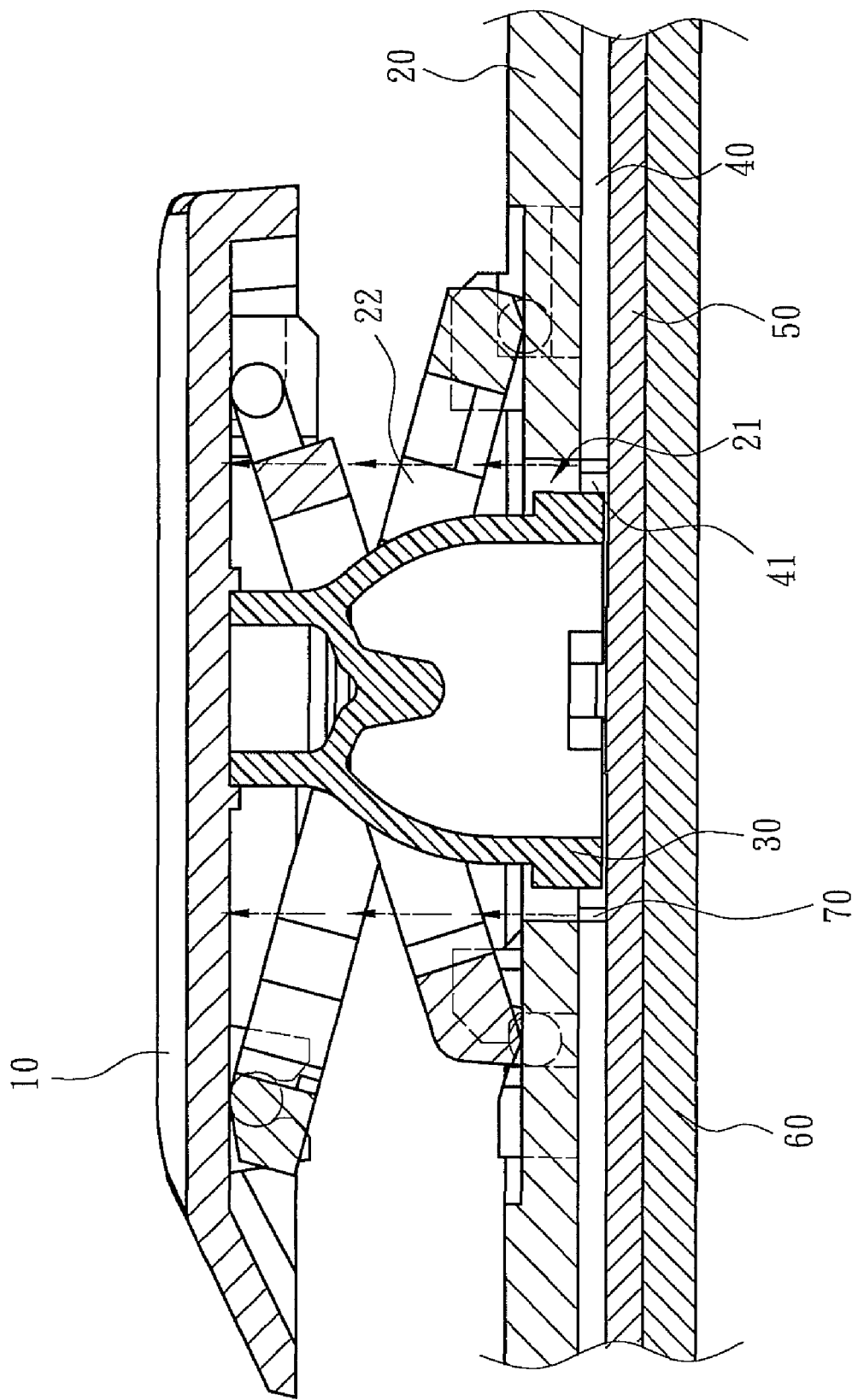
FIG. 3 is a sectional view schematically showing a third embodiment of the present invention.

Refer to FIG. 2 for a second embodiment of the present invention. In the second embodiment, the light emitting eminent 40 is arranged between the circuit board 50 and the substrate 20. In this embodiment, the light emitting element 40 has a through-hole 41 corresponding to the via-hole 21. The through-hole 41 allows the elastic member 30 to contact the circuit board 50. The through-hole 41 also allows the light of the light emitting element 40 to reach the via-hole 21 of the substrate 20, and the light is concentrated by the light concentration member 70 and then transmitted to the keycap 10. Refer to FIG. 3 for a third embodiment of the present invention. In the third embodiment, the light concentration member 70 is formed on the wall of the through-hole 41 of the light emitting element 40. Thereby, the light emitted by the light emitting element 40 can be directly concentrated by the light concentration member 70 of the through-hole 41 of the light emitting element 40 itself and then transmitted through the via-hole 21 of the substrate 20 to the keycap 10. Alternatively, the light concentration members 70 are formed in the substrate 20 and the light emitting element 40 at the same time (not shown in the drawings), whereby light is concentrated twice and enhances the brightness of the keycap 10.

Figure 4:
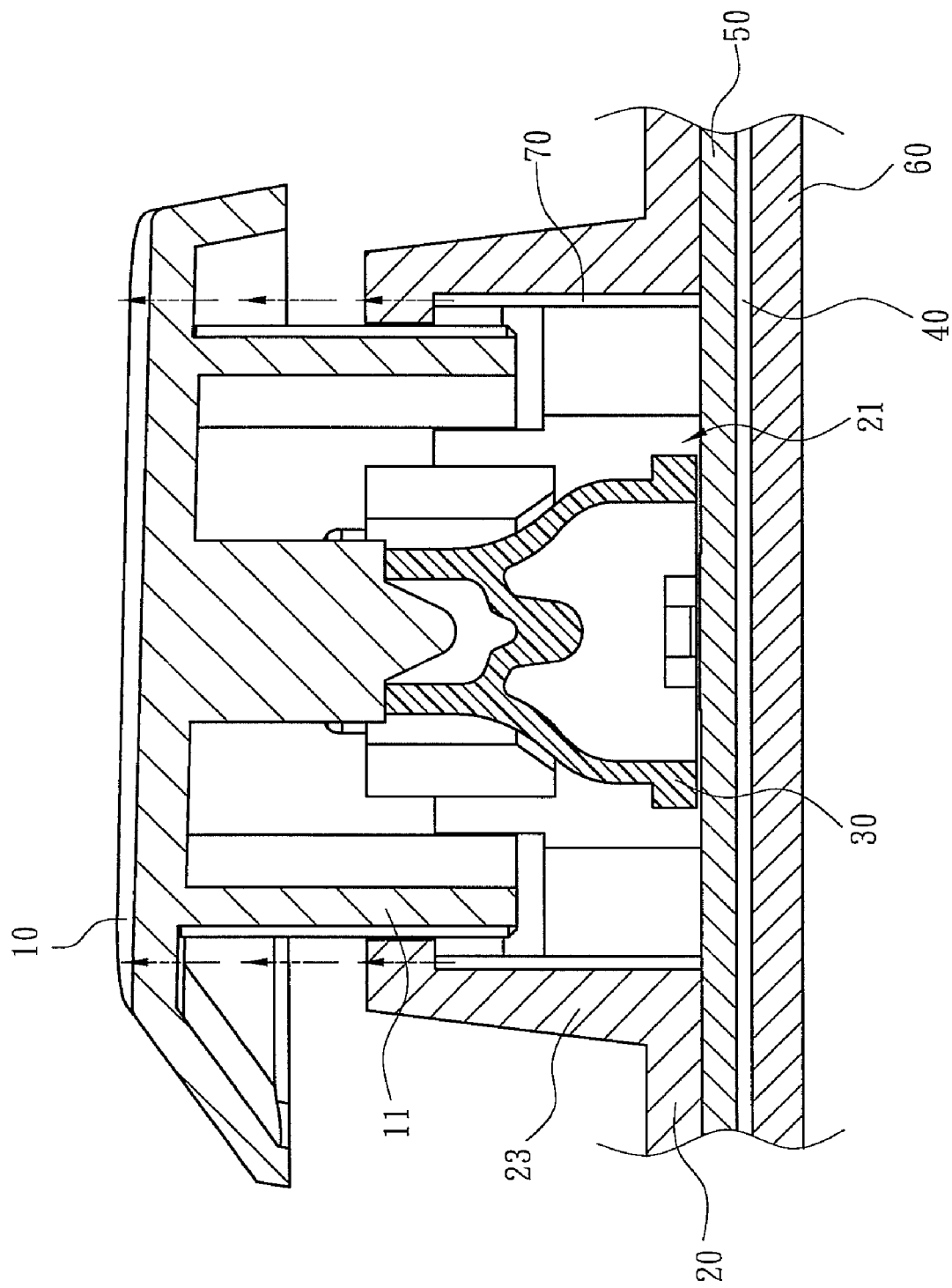
FIG. 4 is a sectional view schematically showing a fourth embodiment of the present invention.
Figure 5:
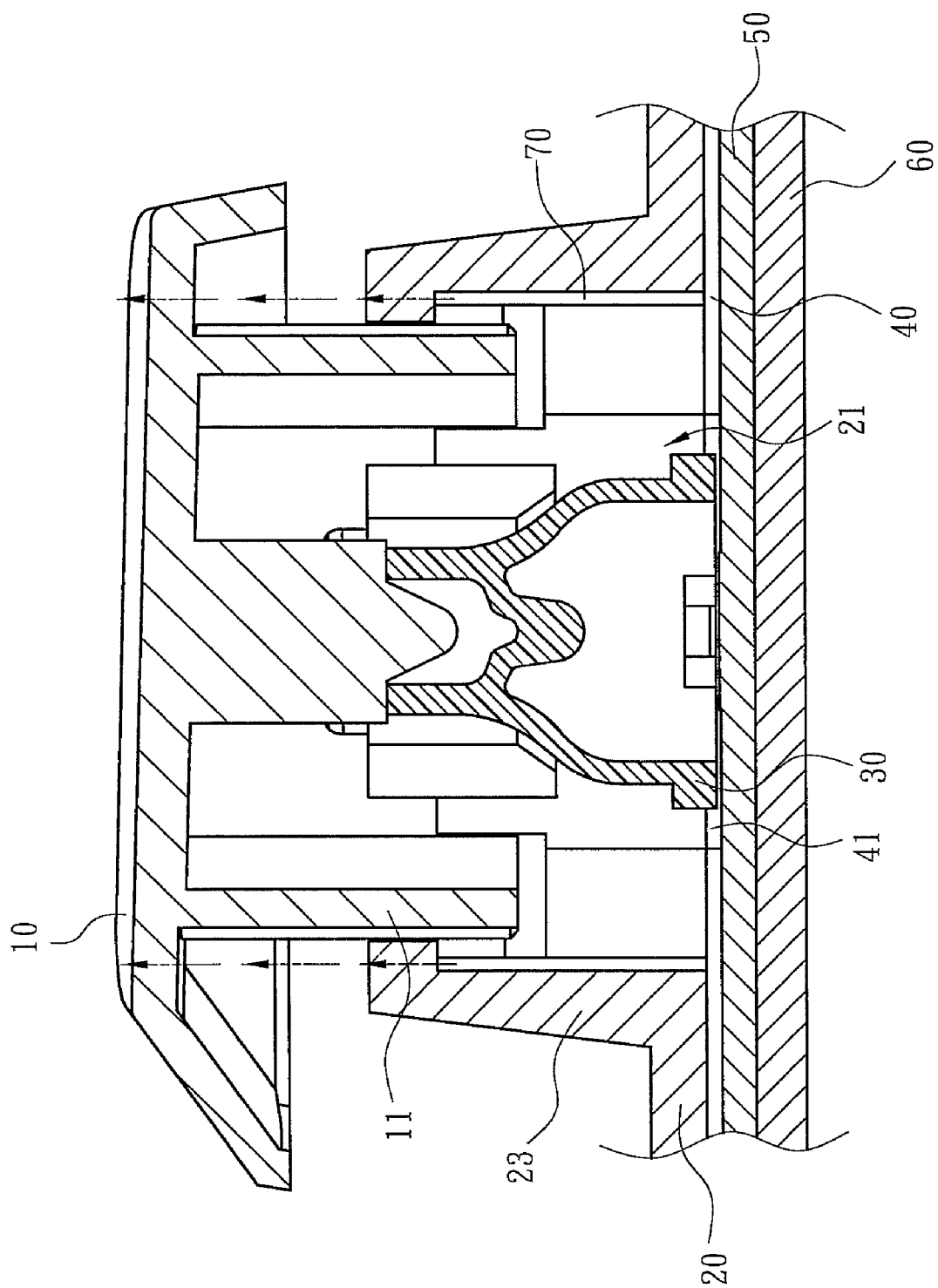
FIG. 5 is a sectional view schematically showing a fifth embodiment of the present invention.
Figure 6:
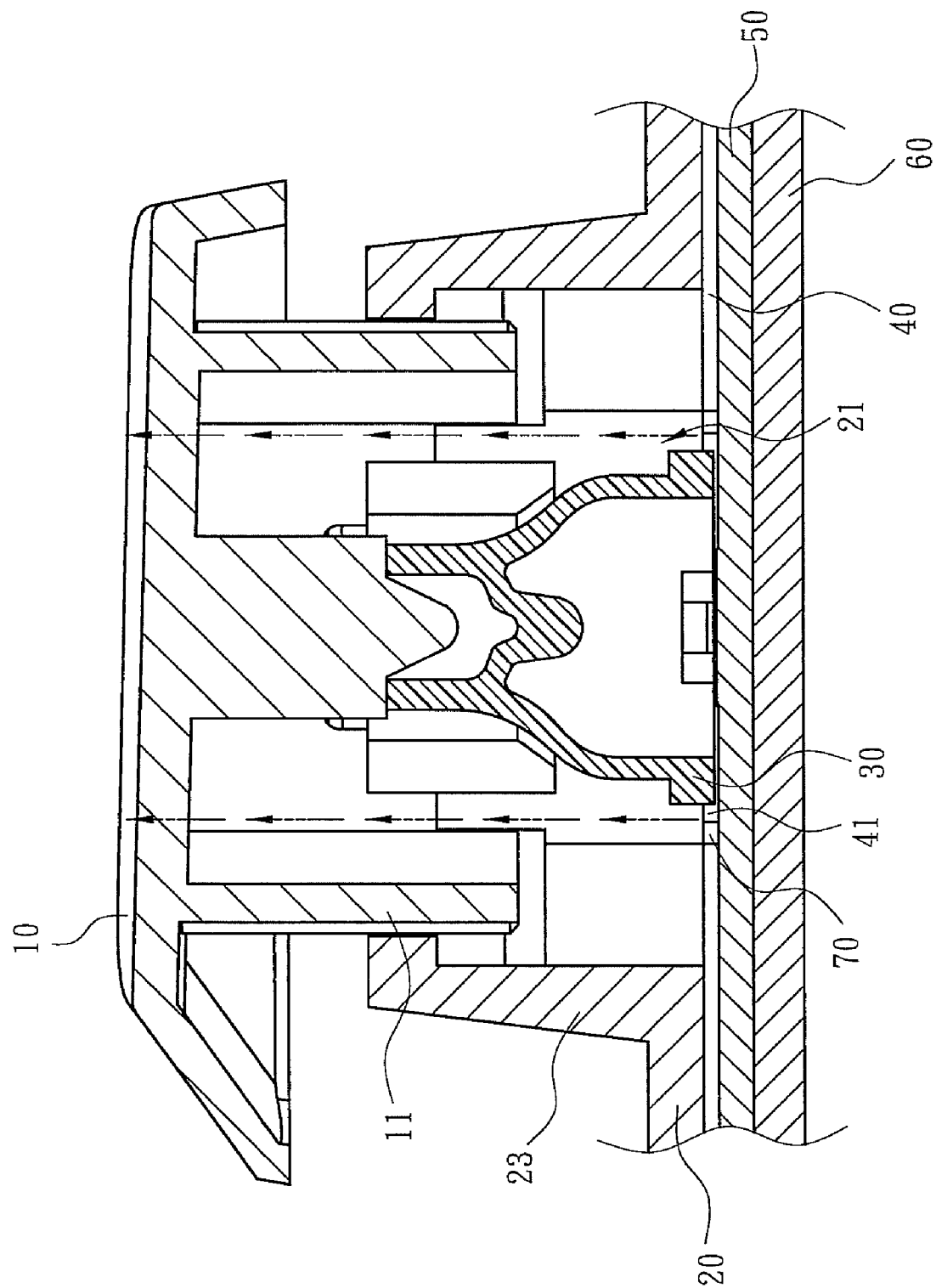
FIG. 6 is a sectional view schematically showing a sixth embodiment of the present invention.

Refer to FIG. 4, FIG. 5 and FIG. 6 for fourth, fifth and sixth embodiments of the present invention. A guide sleeve 23 is formed around the via-hole 21 of the substrate 20, and a key rod 11 is formed in the keycap 10. The key rod 11 is corresponding to the guide sleeve 23 and engaged with the guide sleeve 23 to facilitate the vertical movement of the keycap 10. The embodiments shown in FIG. 4, FIG. 5 and FIG. 6 are similar to the embodiments shown in FIG. 1, FIG. 2 and FIG. 3 except the method of coupling the keycap 10 and the substrate 20. The light emitting element 40 and the light concentration member 70 are arranged in the same positions in all the abovementioned embodiments. In FIG. 4, the light emitting element 40 is arranged between the baseplate 60 and the circuit board 50, and the light concentration member 70 is formed on the inner wall of the guide sleeve 23, which extends from the via-hole 21. In FIG. 5, the light emitting element 40 is arranged between the circuit board 50 and the substrate 20. In FIG. 6, the light concentration member 70 is formed on the wall of the through-hole 41 of the light emitting element 40. Thereby, the light emitted by the light emitting element 40 can be directly concentrated by the light concentration member 70 and then transmitted via the guide sleeve 23 and the key rod 11 to the keycap 10.

Figure 7:
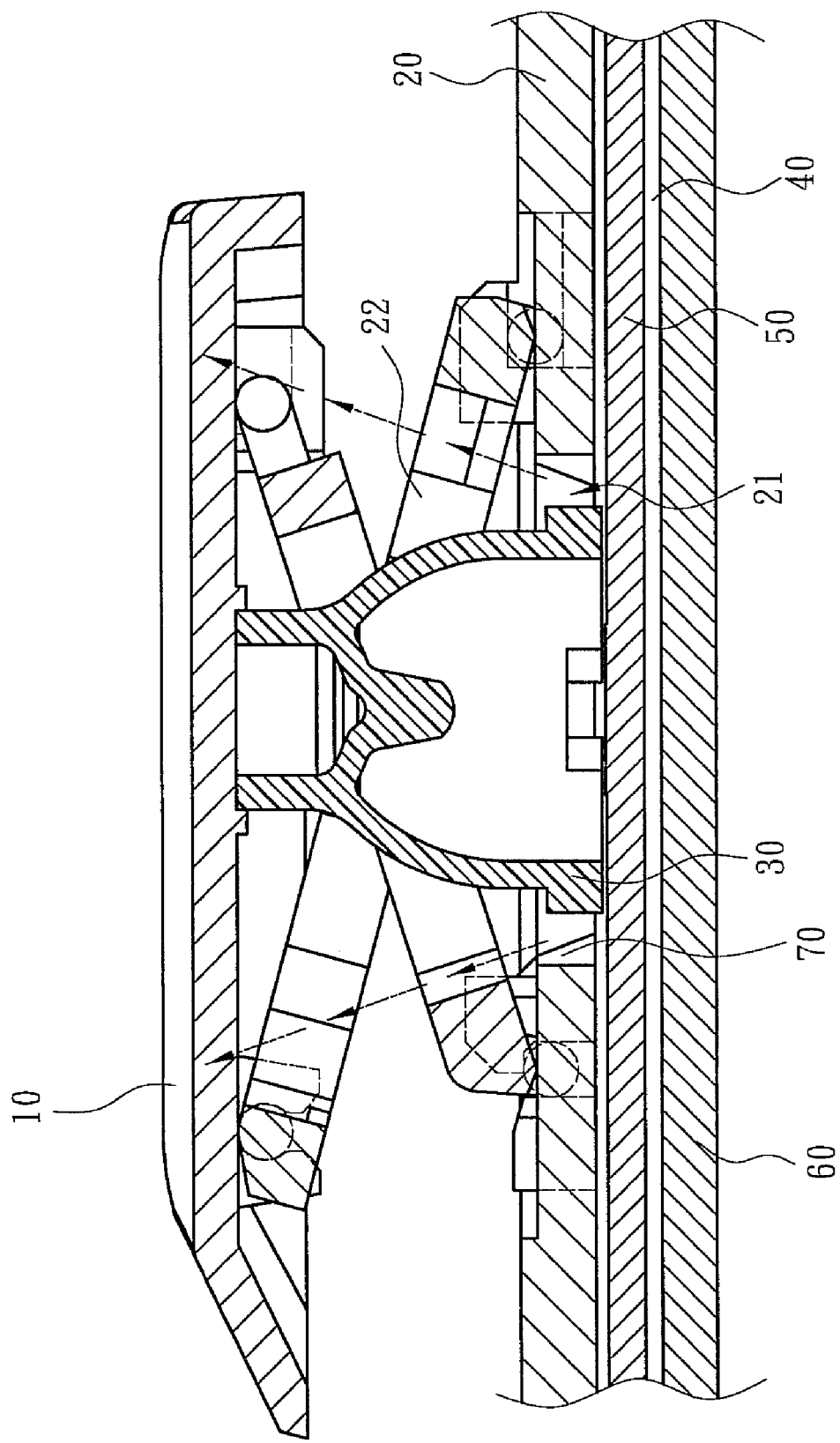
FIG. 7 is a sectional view schematically showing a seventh embodiment of the present invention.
Figure 8:
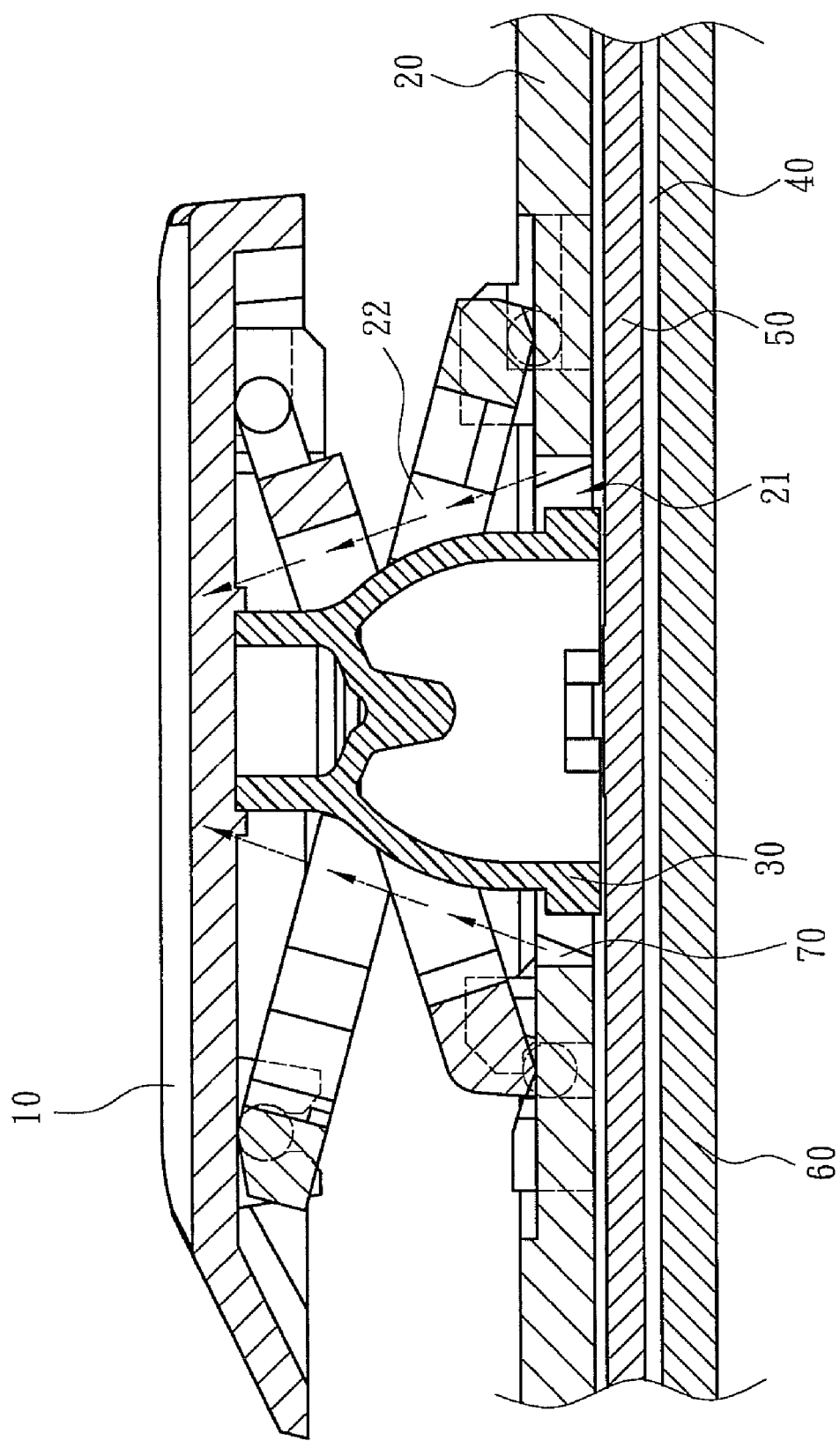
FIG. 8 is a sectional view schematically showing an eighth embodiment of the present invention.
Figure 9:
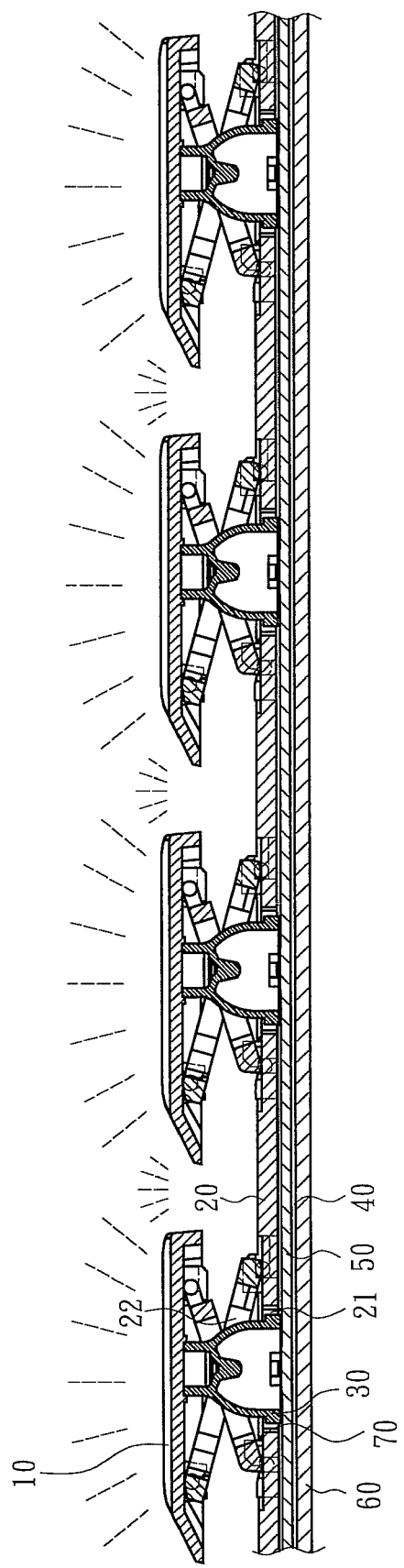
FIG. 9 is a sectional view schematically showing the light emitting status of the present invention.

In all the abovementioned embodiments, the inner diameter of the light concentration member 70 is uniform. In other embodiments, the inner diameter of the light concentration member 70 may vary with the area where the keycap 10 emits light. Refer to FIG. 7, wherein the light concentration member 70 is formed in the substrate 20, and the light emitting element is arranged in between the baseplate 60 and the circuit board 50. In FIG. 7, the inner diameter of the light concentration member 70 gradually increases from the baseplate 60 to the keycap 10 to enlarge the light emitting area of the keycap 10. In FIG. 8, the inner diameter of the light concentration member 70 gradually decreases from the baseplate 60 to the keycap 10 to reduce the light emitting area of the keycap 10. Further, the shape of the light concentration member 70 may vary with the shape of the via-hole 21 of the substrate 20 or the through-hole 41 of the light emitting element 40, for example, a circle or a polygon (such as a square or a rectangle). In the present invention, no matter what shape or inner diameter variation the light concentration member 70 has, the light concentration member 70 always can concentrate the light emitted by the light emitting element 40 and enhance the brightness of each keycap 10 to be higher than the brightness of the gap between the adjacent keycaps 10, as shown in FIG. 9. Thereby, the present invention can exempt the user from the interference of the light of the gaps between the adjacent keycaps 10 and enable the user to easily recognize the keys when he is using a keyboard in dim light or at night.

From the above description, it is known that the present invention can promote the accuracy of operating a keyboard and outperforms the prior arts thereby.

The preferred embodiments described above are only to exemplify the present invention but not to limit the scope of the present invention. Therefore, any equivalent modification or variation according to the spirit of the present invention is to be also included within the scope of the present invention.

What is claimed is:

1. A self-luminous keyboard with brightness-enhanced keycaps comprising
   a keyboard portion further comprising a baseplate; a substrate arranged above said baseplate; a plurality of keycaps arranged above said substrate, coupled to said substrate and able to move up and down, wherein said substrate has a plurality of via-holes corresponding to said keycaps; and a circuit board triggered by the movement of said keycap to output a signal; and
   a light emitting element providing light, wherein there is a light transmission path from said via-holes to said keycaps, and a light concentration member is formed in said light transmission path.

2. The self-luminous keyboard with brightness-enhanced keycaps according to claim 1, wherein said light concentration member is formed on the wall of said via-hole.

3. The self-luminous keyboard with brightness-enhanced keycaps according to claim 2, wherein said light emitting element is arranged between said circuit board and said baseplate.

4. The self-luminous keyboard with brightness-enhanced keycaps according to claim 2, wherein said light emitting element is arranged between said substrate and said circuit board.

5. The self-luminous keyboard with brightness-enhanced keycaps according to claim 4, wherein said light emitting element has a through-hole corresponding to one said via-hole.

6. The self-luminous keyboard with brightness-enhanced keycaps according to claim 5, wherein another light concentration member is formed on the wall of said through-hole of said light emitting element.

7. The self-luminous keyboard with brightness-enhanced keycaps according to claim 1, wherein said light emitting element is arranged between said substrate and said circuit board and has one said through-hole corresponding to one said via-hole, and said light concentration member is formed on the wall of said through-hole.

8. The self-luminous keyboard with brightness-enhanced keycaps according to claim 1, wherein said light concentration member is a light concentration agent.

9. The self-luminous keyboard with brightness-enhanced keycaps according to claim 1, wherein said light concentration member is a light concentration plate.

10. The self-luminous keyboard with brightness-enhanced keycaps according to claim 1, wherein said light emitting element is a light-guiding plate.

11. The self-luminous keyboard with brightness-enhanced keycaps according to claim 1, wherein said light emitting element is an electroluminescent plate.

12. The self-luminous keyboard with brightness-enhanced keycaps according to claim 1, wherein the inner diameter of said light concentration member is uniform.

13. The self-luminous keyboard with brightness-enhanced keycaps according to claim 1, wherein the inner diameter of said light concentration member gradually increases from said baseplate to said keycap.

14. The self-luminous keyboard with brightness-enhanced keycaps according to claim 1, wherein the inner diameter of the light concentration member gradually decreases from said baseplate to said keycap.

15. The self-luminous keyboard with brightness-enhanced keycaps according to claim 1, wherein said light concentration member has a shape of a circle.

16. The self-luminous keyboard with brightness-enhanced keycaps according to claim 1, wherein said light concentration member has a shape of a polygon.

17. The self-luminous keyboard with brightness-enhanced keycaps according to claim 1, wherein an elastic member is arranged in each of said via-holes, and said elastic member supports said keycap and contacts said circuit board during a vertical movement of said keycap.

18. The self-luminous keyboard with brightness-enhanced keycaps according to claim 17, wherein said substrate has a plurality of actuation mechanisms each coupled to one said keycap and implementing the vertical movement of said keycap.

19. The self-luminous keyboard with brightness-enhanced keycaps according to claim 17, wherein a guide sleeve is formed around said via-hole, and a key rod is formed in said keycap; said key rod is corresponding to said guide sleeve and engaged with said guide sleeve to facilitate the vertical movement.

* * * * *